United States Patent
Gilligan-Lee et al.

(10) Patent No.: US 12,137,148 B1
(45) Date of Patent: Nov. 5, 2024

(54) SYSTEM AND METHOD FOR ESTIMATING A LONG-TERM EFFECT IN THE PRESENCE OF UNOBSERVED CONFOUNDING

(71) Applicant: Spotify AB, Stockholm (SE)

(72) Inventors: Ciarán Gilligan-Lee, Dublin (IE); Lucas Maystre, London (GB); Graham Van Goffrier, Leicester (GB)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/351,893

(22) Filed: Jul. 13, 2023

(51) Int. Cl.
*H04L 67/306* (2022.01)
*H04L 67/00* (2022.01)

(52) U.S. Cl.
CPC ............ *H04L 67/306* (2013.01); *H04L 67/34* (2013.01)

(58) Field of Classification Search
CPC .............................. H04L 67/306; H04L 67/34
See application file for complete search history.

(56) References Cited

U.S. PATENT DOCUMENTS

| | | | |
|---|---|---|---|
| 10,380,649 B2 * | 8/2019 | Johnson | G06Q 30/0271 |
| 10,552,863 B1 * | 2/2020 | Sadagopan | G06N 7/01 |
| 11,354,566 B1 | 6/2022 | Chen et al. | |
| 2010/0198767 A1 * | 8/2010 | Farrelly | G06F 16/686 706/46 |
| 2017/0237792 A1 * | 8/2017 | Taghavi | H04L 67/535 709/219 |
| 2022/0067087 A1 * | 3/2022 | Reardon | G06F 16/638 |
| 2022/0415486 A1 | 12/2022 | Shahn et al. | |

FOREIGN PATENT DOCUMENTS

| | | | |
|---|---|---|---|
| CN | 116245573 A | * | 6/2023 |
| EP | 3822882 A1 | | 5/2021 |

OTHER PUBLICATIONS

Van Goffrier, Graham; Estimating long-term causal effects from short-term experiments and long-term observational data with unobserved confounding; Proceedings of Machine Learning Research vol. TBD:1-22, 2023, 2nd Conference on Causal Learning and Reasoning, Feb. 21, 2023, 23 pages.

* cited by examiner

*Primary Examiner* — Bryan Y Lee
(74) *Attorney, Agent, or Firm* — McDonnell Boehnen Hulbert & Berghoff LLP

(57) ABSTRACT

Systems and methods for estimating a long-term effect in the presence of unobserved confounding are provided. For example, a long-term effect of a change in user interface of a media playback application may be estimated. An experimental dataset and an observational dataset may be compiled using data from a plurality of computing devices. The observational dataset may include unobserved confounding. Using the experimental dataset, a short-term effect may be determined. Using the short-term effect and samples from the observational dataset, an instrumental variable may be computed that may be used in instrumental variable regression to estimate the long-term effect.

20 Claims, 10 Drawing Sheets

SYSTEM AND METHOD FOR ESTIMATING A LONG-TERM EFFECT IN THE PRESENCE OF UNOBSERVED CONFOUNDING

BACKGROUND

Understanding and quantifying cause and effect relationships is an important problem in many domains. For example, it may be important with a media playback application to determine an effect of a change in user interface, such as e.g., presenting a recommendation. One solution to this problem is to perform a randomized controlled experiment. However, even when randomized controlled experiments can be performed, they may have relatively short durations due to cost considerations. This may make learning long-term causal effects using randomized controlled experiments a very challenging task since the long-term outcome is only observed after a long delay.

Observational data may also be used to estimate long-term causal effects. In contrast to experimental data, observational data may be easier and cheaper to acquire, which may make it more likely to include long-term outcome observations. However, observational data may include unobserved confounding, which may lead to biased effect estimates.

SUMMARY

In general terms, this disclosure is directed to a system and method for estimating a long-term effect in the presence of unobserved confounding. Short-term experimental data and long-term observational data may be used to estimate the long-term effect, even if the observational data includes unobserved confounding.

In a first aspect, a method for estimating a long-term effect of a change in user interface of a media playback application is provided. an experimental dataset is compiled at a server. The experimental dataset includes short-term data on the change in user interface, and the short-term data includes a treatment and a short-term outcome. The data in the experimental dataset is from a first plurality of computing devices executing the media playback application. A short-term effect of the treatment on the short-term outcome is determined from the experimental dataset. An observational dataset is compiled at the server. The observational dataset includes the short-term data on the change in user interface and long-term data on the change in user interface. The long-term data includes a long-term outcome. The observational dataset also includes unobserved confounding. The observational dataset is compiled using data from a second plurality of computing devices executing the media playback application. A long-term effect of the short-term outcome on the long-term outcome is estimated by computing a portion of the short-term outcome that has no causal contribution from the treatment using samples from the observational dataset and the short-term effect and performing regression using the portion of the short-term outcome.

In a second aspect, a system for estimating a long-term effect of a change in user interface of a media playback application is provided. The system comprises one or more processors and one or more computer-readable storage devices storing data instructions. When the instructions are executed by the one or more processors, the system compiles an experimental dataset, determines a short-term effect, compiles an observational dataset, and estimates a long-term effect. The experimental dataset includes short-term data on the change in user interface, and the short-term data includes a treatment and a short-term outcome. The data in the experimental dataset is from a first plurality of computing devices executing the media playback application. The short-term effect determined by the system is a short-term effect of the treatment on the short-term outcome. The observational dataset includes the short-term data on the change in user interface and long-term data on the change in user interface. The long-term data includes a long-term outcome. The observational dataset also includes unobserved confounding. The observational dataset is compiled using data from a second plurality of computing devices executing the media playback application. The long-term effect determined by the system is a long-term effect of the short-term outcome on the long-term outcome. The long-term effect of the short-term outcome on the long-term outcome is estimated by computing a portion of the short-term outcome that has no causal contribution from the treatment using samples from the observational dataset and the short-term effect and performing regression using the portion of the short-term outcome.

In a third aspect, a non-transitory computer-readable medium having stored thereon data instructions is provided. When the instructions are executed by one or more processors, the one or more processors compile an experimental dataset at a server, determine a short-term effect, compile an observational dataset at the server, and estimate a long-term effect. The experimental dataset includes short-term data on the change in user interface, and the short-term data includes a treatment and a short-term outcome. The data in the experimental dataset is from a first plurality of computing devices executing the media playback application. The short-term effect determined by the one or more processors is a short-term effect of the treatment on the short-term outcome. The observational dataset includes the short-term data on the change in user interface and long-term data on the change in user interface. The long-term data includes a long-term outcome. The observational dataset also includes unobserved confounding. The observational dataset is compiled using data from a second plurality of computing devices executing the media playback application. The long-term effect determined by the one or more processors is a long-term effect of the short-term outcome on the long-term outcome. The long-term effect of the short-term outcome on the long-term outcome is estimated by computing a portion of the short-term outcome that has no causal contribution from the treatment using samples from the observational dataset and the short-term effect and performing regression using the portion of the short-term outcome.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
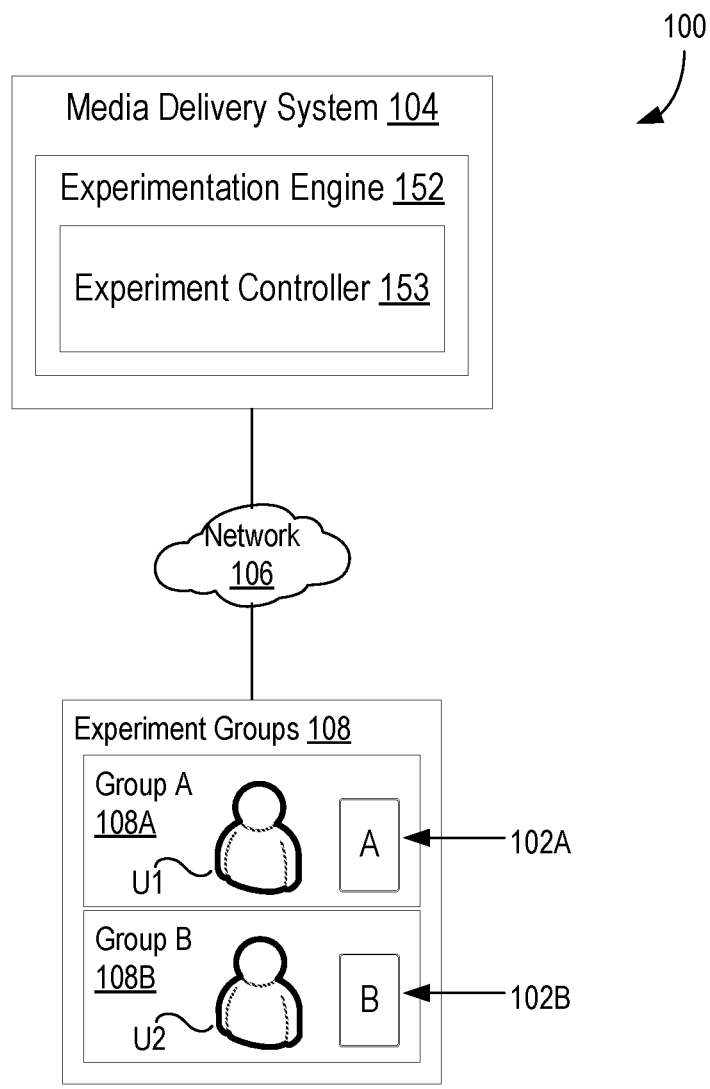
FIG. 1 illustrates a schematic block diagram of an example media playback system for determining a long-term effect of a change in user interface.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As used herein, the term "including" as used herein should be read to mean "including, without limitation," "including but not limited to," or the like. The term "substantially" as used herein is a broad term and is to be given its ordinary and customary meaning to a person of ordinary skill in the art (and is not to be limited to a special or customized meaning), and furthermore refers without limitation to being largely but not necessarily wholly that which is specified.

As briefly described above, embodiments of the present disclosure are directed to a system and method for estimating a long-term effect in the presence of unobserved confounding. While aspects of the present disclosure may be described in the context of determining a long-term effect of a change in user interface for a media playback application, the systems and methods described herein are applicable in any context in which long-term effects may be estimated using short-term experimental data and long-term observational data, particularly if unobserved confounding is present in the observational data.

In example aspects, an experimental dataset and an observational dataset are used to estimate a long-term effect of a change in user interface of a media playback application. The experimental dataset may be compiled during a randomized controlled experiment to obtain unbiased, short-term data. The observational data may be compiled using observational data to obtain non-randomized, long-term data. Because the observational data is non-randomized, unobserved confounding may be present in the observational data. Unobserved confounding may be any factors that influence the observational data other than the change in user interface for which the effect is being estimated. For example, if the observational data includes listening data for users, such as a number of minutes that the users have listened to an album, an unobserved confounder may be a factor that causes users to listen to the album more frequently, such as the artist of the album going on tour. Both the experimental dataset and the observational dataset may be compiled using data from a plurality of computing devices executing the media playback application.

Using the short-term experimental data and the long-term observational data, the long-term effect can be estimated. A short-term effect can be calculated using the experimental data. Because the experimental data is unbiased, the short-term effect describes the effect of the change in user interface and does not include any unobserved confounding. The long-term effect can be estimated by using the short-term effect and samples from the observational data to compute an instrumental variable and then using this instrumental variable in instrumental variable regression.

By estimating the long-term effect in this way, the long-term effect can be estimated with short-term experimental data even if unobserved confounding is present in the long-term observational data. This allows for more robust and trustworthy long-term effect estimates to be provided in situations in which it is impractical or infeasible to perform long-term randomized controlled experiments. This also increases the efficiency of the media playback system(s) associated with the media playback application. By using a short-term randomized controlled experiment with long-term observational data, an experimentation engine can operate more efficiently, only needing to control distribution of various implementations of the user interface in the short-term for the randomized controlled experiment and having fewer operations it needs to perform in the long-term.

Turning now to FIG. 1, an example media playback system 100 for estimating the long-term effect of a change in user interface for a media playback application is shown. The system 100 includes a media delivery system 104 and a plurality of computing devices 102. The media delivery system 104 delivers media content to computing devices 102 over a data communication network 106. Each computing device 102 executes a media playback application.

The media delivery system 104 may implement a randomized controlled experiment to determine a short-term effect of the change in user interface. The media delivery system 104 may have an experimentation engine 152 that includes an experiment controller 153. The experiment controller 153 may maintain a plurality of different user interfaces for the media playback application and distribute different user interfaces to the computing devices 102 based on an experiment group 108 to which the users U1, U2 have been assigned. For example, the experiment controller 153 may distribute a first user interface to the computing device 102A because the user U1 is assigned to a first experiment group 108A. The experiment controller 153 may, however, distribute a second user interface to the computing device 102B because the user U2 is assigned to a second experiment group 108B. The experiment engine 152 may then track short-term data from the computing devices 102 during the randomized controlled experiment, which may be used to determine the short-term effect of the change in user interface. Although FIG. 1 shows two experiment groups 108, in alternative embodiments, different numbers of experiment groups 108 may be used. Similarly, while to user interfaces are described as being shown to the experiment groups 108, in alternative embodiments, different numbers of user interfaces may be used.

After the end of the randomized controlled experiment, the experimentation engine 152 may continue to collect long-term data from the computing devices 102 for use in determining the long-term effect of the change in user interface. This long-term data may be observational data, which may contain unobserved confounding. During the collection of the long-term observational data, the experiment controller 153 may distribute the same user interface to all computing devices 102, regardless of the experiment group to which the users U1, U2 are assigned. For example, during the collection of long-term observational data, all users U1, U2 may be shown the second user interface that was presented in the randomized controlled experiment. This may allow the experiment controller 153 to be more efficient in the long-term, as it need not continue to execute experiment controlling operations to control the distribution of multiple user interfaces to users based on assigned experiment groups 108, and the experiment controller 153, or associated components, may not need to continue to store a plurality of user interfaces for the long-term. In alternative embodiments, the users U1, U2 may continue to be presented with different user interfaces during the collection of the observational data.

Once the long-term observational data has been collected, the experimentation engine 152 may use the short-term data and the long-term data to estimate the long-term effect of the change in user interface. This may be done using the method further described herein.

Figure 2:
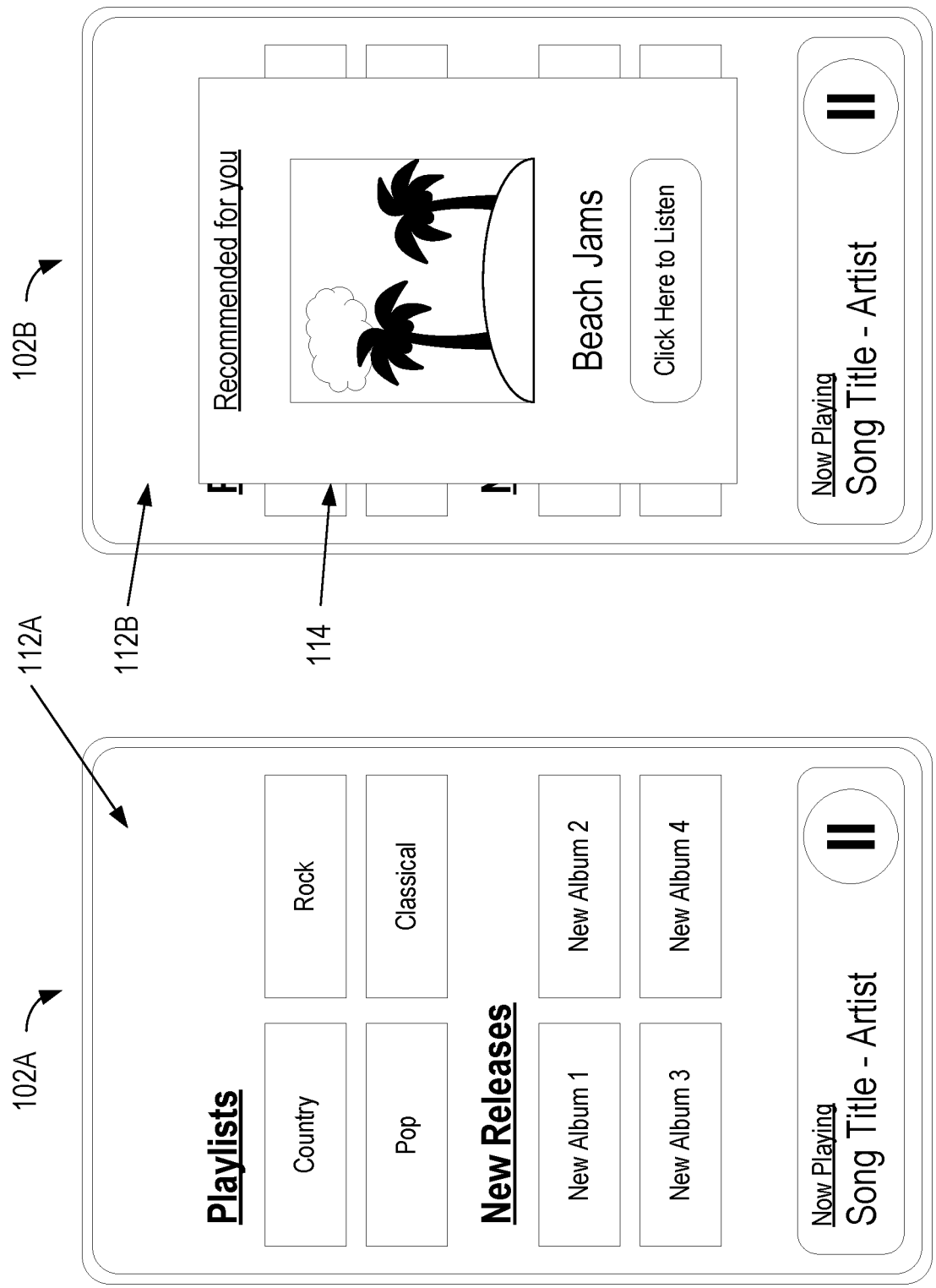
FIG. 2 illustrates an example of a change in user interface.

Referring now to FIG. 2, an example of a change in user interface for a media playback application is shown. A first user interface 112A is displayed on a first computing device 102A. In the illustrated embodiment, the first user interface 112A includes options to select from a plurality of playlists or new releases, as well as controls to control a currently playing track. As described above, this first user interface 112A may be displayed to a first experiment group (e.g., experiment group 108A in FIG. 1) during a randomized controlled experiment.

A second user interface 112B is displayed on a second computing device 102B. In the illustrated embodiment, the second user interface 112B includes the options and controls included in the first user interface 112A and a recommendation overlay 114. The recommendation overlay 114 may provide a recommendation to a user of any type of media content. For example, the recommendation overlay 114 may include a recommendation of a track, a playlist, an artist, an album, or a concert. The recommendation overlay 114 may contain a personalized recommendation for the user, or the recommendation may be the same for all users to which the second user interface 112B is displayed.

As described above, this second user interface 112B may be displayed to a second experiment group (e.g., experiment group 108B in FIG. 1) during the randomized controlled experiment. Additionally, this second user interface 112B may also be presented to both the first experiment group and the second experiment group after the end of the randomized controlled experiment so that long-term observational data may be collected. As will be described herein, a long-term effect of the change in user interface from the first user interface 112A to the second user interface 112B can then be determined using short-term data from the randomized controlled experiment and long-term observational data. In the illustrated example, because the change in user interface includes the recommendation overlay 114, the long-term effect of the change in user interface may represent the effect of displaying the recommendation overlay 114.

Figure 3:
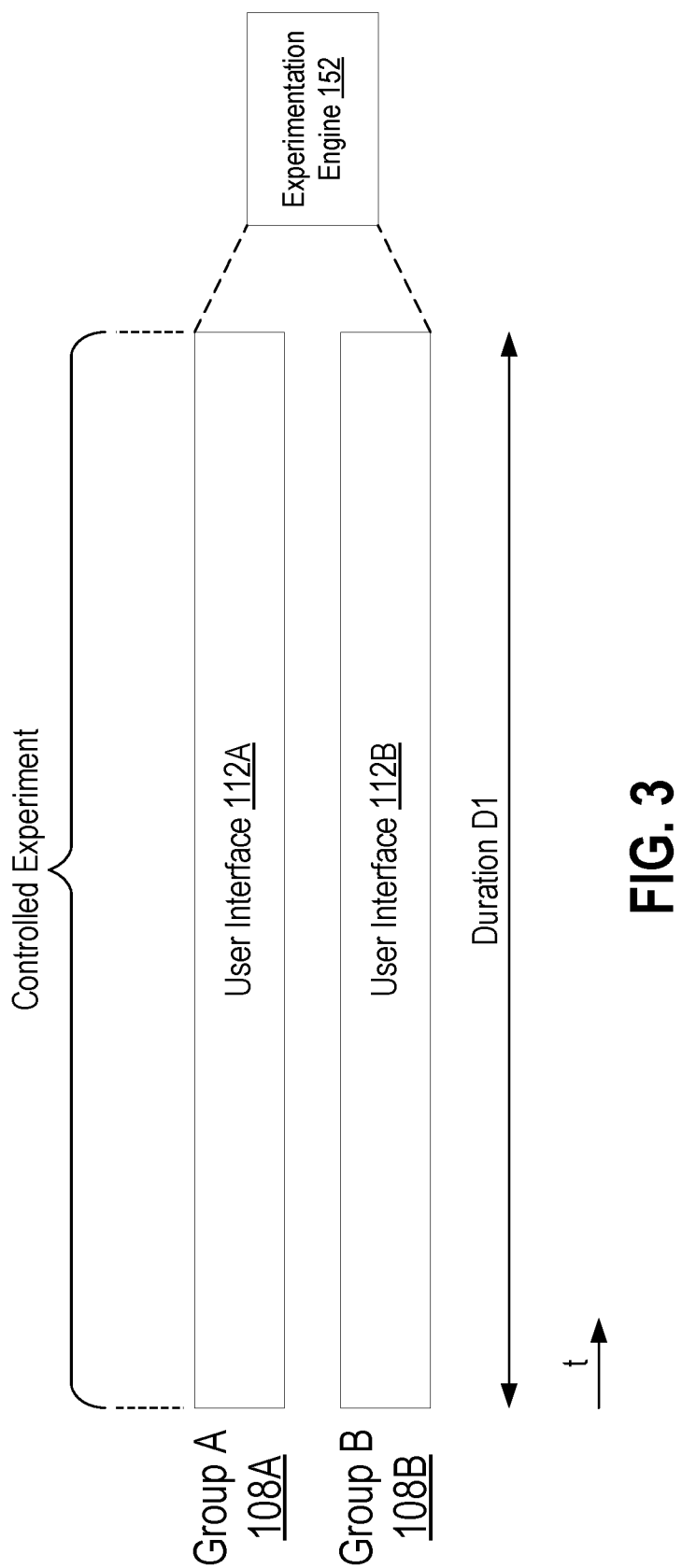
FIG. 3 illustrates a timeline of a first example method for determining a long-term effect of a change in user interface.

FIG. 3 illustrates a first method for determining a long-term effect of a change in user interface. In the illustrated method, a controlled experiment is conducted over a long-term duration D1. For the entirety of the duration D1 during which the controlled experiment is ongoing, a first group 108A is shown a first user interface 112A, and a second group 108B is shown a second user interface 112B. Throughout the duration D1, an experimentation engine 152 may collect data from computing devices of users in the experimentation groups 108. For example, the experimentation engine 152 may collect listening data. In embodiments such as the one illustrated in FIG. 2 in which the change in user interface includes displaying a recommendation, the data collected by the experimentation engine 152 may be listening data about the recommendation—e.g., a number of minutes that a user has listened to the recommendation.

Because the entirety of the duration D1 in which data is collected by the experimentation engine 152 is a controlled experiment, it may be assumed that there is no unobserved confounding in the collected data. Therefore, the experimentation engine 152 can use the data to calculate an unbiased long-term effect of the change in user interface. However, to perform the controlled experiment, the experimentation engine 152 must perform experiment controlling operations during the entire duration D1 to control which group 108 sees which user interface 112.

Figure 4:
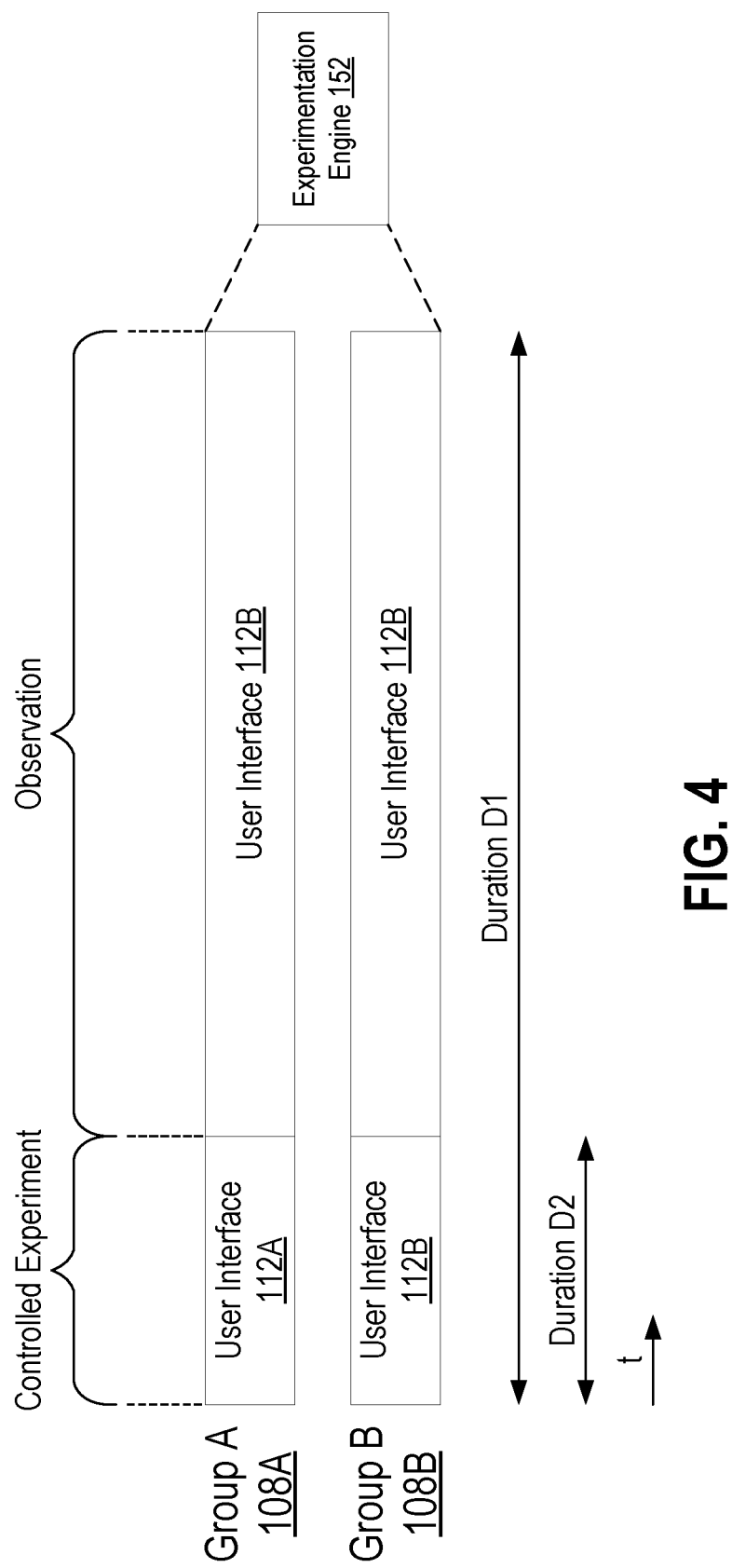
FIG. 4 illustrates a timeline of a second example method for determining a long-term effect of a change in user interface.

FIG. 4 illustrates a second method for determining a long-term effect of a change in user interface. In contrast to the first method illustrated in FIG. 3, a controlled experiment is only conducted over a short-term duration D2, and the remainder of the long-term duration D1 is spent in an observational period. Although the observational period is depicted as beginning immediately after the end of the controlled experiment, in alternative embodiments, there may be a gap between the end of the controlled experiment and the beginning of the observational period.

Like with the first method of FIG. 3, a first group 108A is shown a first user interface 112A and a second group 108B is shown a second user interface 112B during the controlled experiment. After the end of the controlled experiment, both the first group 108A and the second group 108B are shown the second user interface 112B for the observational period. In alternative embodiments, both the first group 108A and the second group 108B are shown the first user interface 112A for the observational period after the controlled experiment. In further alternative embodiments, both the first user interface 112A and the second user interface 112B are shown to users during the observational period. For example, all users in the first group 108A may be shown the first user interface 112A while all users in the second group 112B may be shown the second user interface 112B. In another example, some users in the first group 108A may be shown the first user interface 112A while other users in the first group 108A may be shown the second user interface 112B. Similarly, some users in the second group 108B may be shown the first user interface 112A while other users in the second group 108B may be shown the second user interface 112B. In other alternative embodiments, some users may be shown a third user interface during the observational period, rather than the first user interface 112A or the second user interface 112B.

An experimentation engine 152 may collect data from computing devices of the users in the experimentation groups 108 throughout the duration D1. As with the example shown in FIG. 3, the experimentation engine 152 may collect listening data, which may be for a recommendation presented in the change in user interface. Short-term data collected during the controlled experiment may not contain unobserved confounding; however, long-term data collected during the observational period may contain unobserved confounding. Despite the unobserved confounding in the long-term data, the experimentation engine 152 may still be able to estimate an unbiased long-term effect, as explained herein.

In an embodiment, the experimentation engine 152 collects the short-term data and the long-term data from the same computing devices. In alternative embodiments, the experimentation engine 152 may collect the short-term data from different computing devices than from which the long-term data is collected. For example, the computing devices from which the short-term data is collected may be a subset of the computing devices from which the long-term data is collected. In another example, the computing devices from which the long-term data is collected may be a subset of the computing devices from which the short-term data is collected.

Because the controlled experiment is only performed for the short-term duration D2, the experimentation engine 152 can operate more efficiently over the long-term duration D1. The experimentation engine 152 needs only to perform experiment controlling operations during the short-term duration D2. For example, the experimentation engine 152 may only need to maintain multiple user interfaces and control distribution of the user interfaces to users based on experimentation groups during the short-term duration D2. After the controlled experiment concludes, the experimentation engine 152 may only be responsible for collecting data during the remainder of the long-term duration D1.

Figure 5:
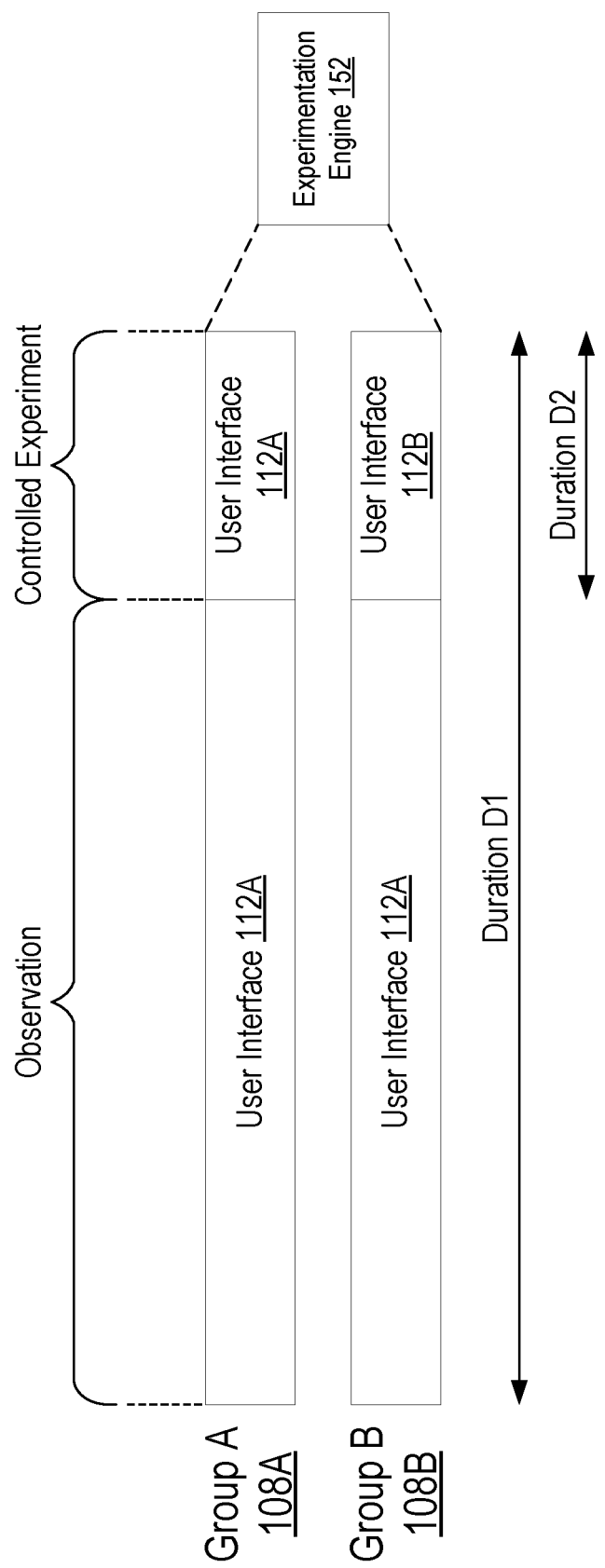
FIG. 5 illustrates a timeline of a third example method for determining a long-term effect of a change in user interface.

FIG. 5 illustrates a third method for determining a long-term effect of a change in user interface. Like with the method illustrated in FIG. 4, a controlled experiment is conducted over a short-term duration D2. However, in the illustrated embodiment, the controlled experiment follows an observational period instead of preceding it. Although the observational period is depicted as immediately preceding the controlled experiment, in alternative embodiments, there may be a gap between the conclusion of the observational period and the beginning of the controlled experiment.

During the observational period, both a first group 108A and a second group 108B may be shown a first user interface 112A. In alternative embodiments, both groups 108 are shown a second user interface 112B during the observational period. In further alternative embodiments, some users may be shown the first user interface 112A and other users may be shown the second user interface 112B during the observational period. In other alternative embodiments, some users may be shown a third user interface during the observational period. During the controlled experiment, the first group is shown the first user interface 112A and the second group is shown the second user interface 112B.

An experimentation engine 152 may collect data from computing devices of the users throughout the duration D1. Long-term data collected during the observational period may contain unobserved confounding, but the short-term data collected during the controlled experiment may not. As described above, the computing devices from which the long-term data is collected may be the same computing devices from which the short-term data is collected, or the computing devices may be different.

As with the embodiment in FIG. 4, the experimentation engine 152 may operate more efficiently over the long-term duration D1 by not needing to perform experiment controlling operations during the observational period before the controlled experiment.

Figure 6:
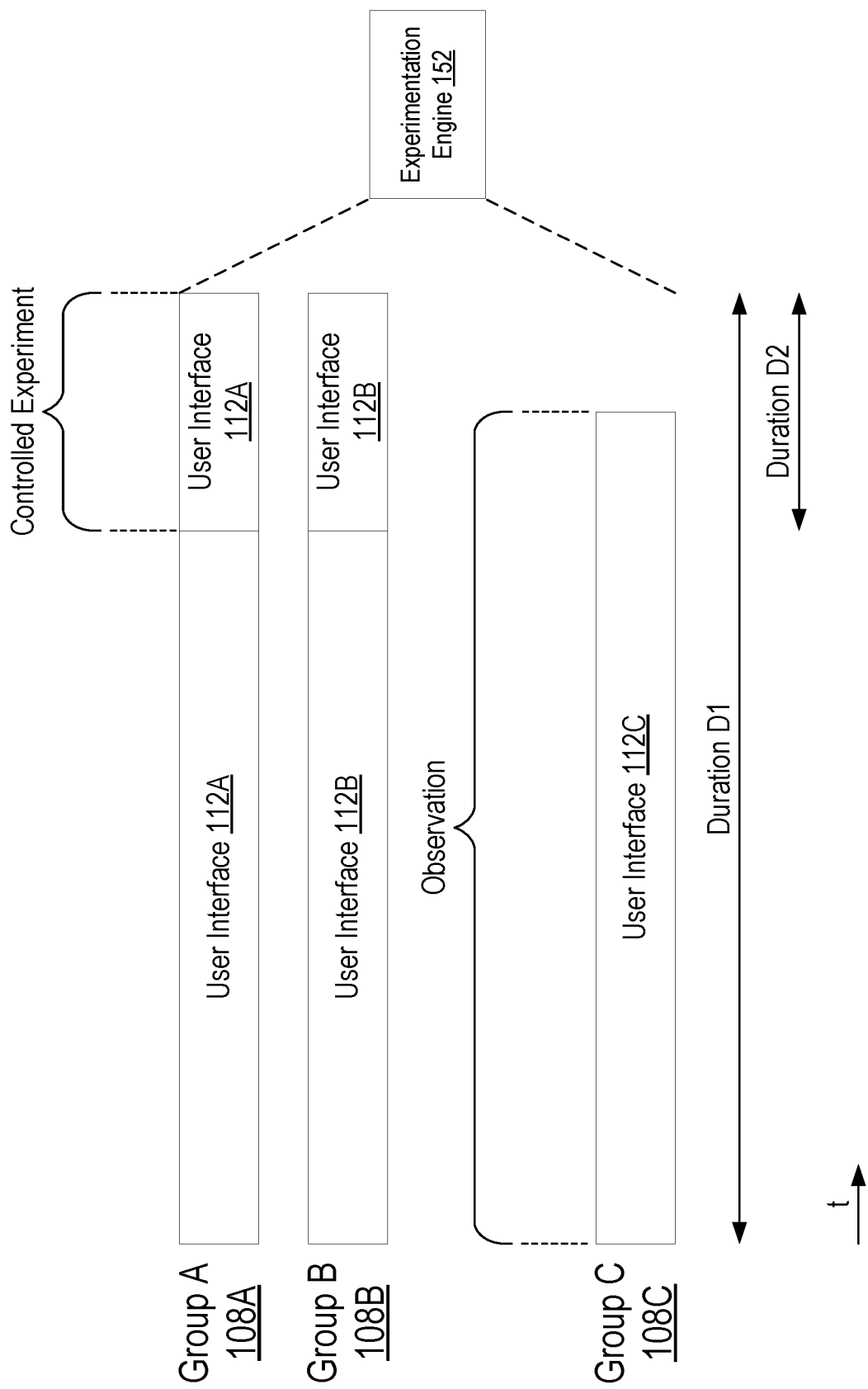
FIG. 6 illustrates a timeline of a fourth example method for determining a long-term effect of a change in user interface.

FIG. 6 illustrates a fourth method for determining a long-term effect of a change in user interface. Like in the methods depicted in FIGS. 4-5, there may be both a controlled experiment and an observational period during a duration D1. However, in the embodiment depicted in FIG. 6, the observational period may overlap with the controlled experiment.

During the controlled experiment, a first group of users 108A may be shown a first user interface 112A, while a second group of users 108B may be shown a second user interface 112B. The controlled experiment may be conducted over a short-term duration D2. During the duration D1 before the controlled experiment, the first group of users 108A may be shown the first user interface, and the second group of users 108B may be shown the second user interface 112B. In alternative embodiments, both the first group 108A and the second group 108B are shown the same user interface 112, which may be there first user interface 112A, the second user interface 112B, or a third user interface 112C. In further alternative embodiments, users within the same group may be shown different user interfaces 112.

Unlike in the methods in FIGS. 4-5, observational data may be collected from a third group of users 108C during the observational period. The third group of users 108C may include users who are representative of the users in the first group 108A and the second group 108B. During the observational period, users in the third group 108C may be shown the third user interface 112C. In alternative embodiments, users in the third group 108C may be shown other user interfaces 112, such as the first user interface 112A or the second user interface 112B. In some embodiments, users in the third group 108C may be shown different user interfaces 112. For example, some users in the third group 108C may be shown the first user interface 112A, other users in the third group 108C may be shown the second user interface 112B, and further users in the third group 108C may be shown the third user interface 112C. In alternative embodiments, observational data may also be collected from the users in the first group 108A and the second group 108B during the parts of the observational period in which the controlled experiment is not ongoing. Users in the first group 108A and the second group 108B may be shown any of the described user interfaces 112 during these parts of the observational period that the controlled experiment is not ongoing.

The observational period may overlap with the controlled experiment, as is shown in the illustrated embodiment. In the illustrated embodiment, part of the observational period occurs before the controlled experiment. In alternative embodiments, the observational period may additionally or alternatively continue after the controlled experiment. In further embodiments, the observational period may not overlap with the controlled experiment; the observational period may be entirely before or entirely after the controlled experiment. In these embodiments, the observational period may immediately precede or immediately follow the controlled experiment. Alternatively, there may be a gap between the controlled experiment and the observational period.

Additionally, while the observational period is depicted as only occurring over a portion of the duration D1, in alternative embodiments, the observational period may occur over the entirety of the duration D1.

As with the previously described method, an experimentation engine 152 may collect data from computing devices of the users throughout the duration D1. Long-term data collected during the observational period may contain unobserved confounding, but the short-term data collected during the controlled experiment may not. Because the experimentation engine 152 only needs to perform experiment controlling operations during the duration D2 during which the controlled experiment is ongoing, it may operate more efficiently over the duration D1.

Figure 7:
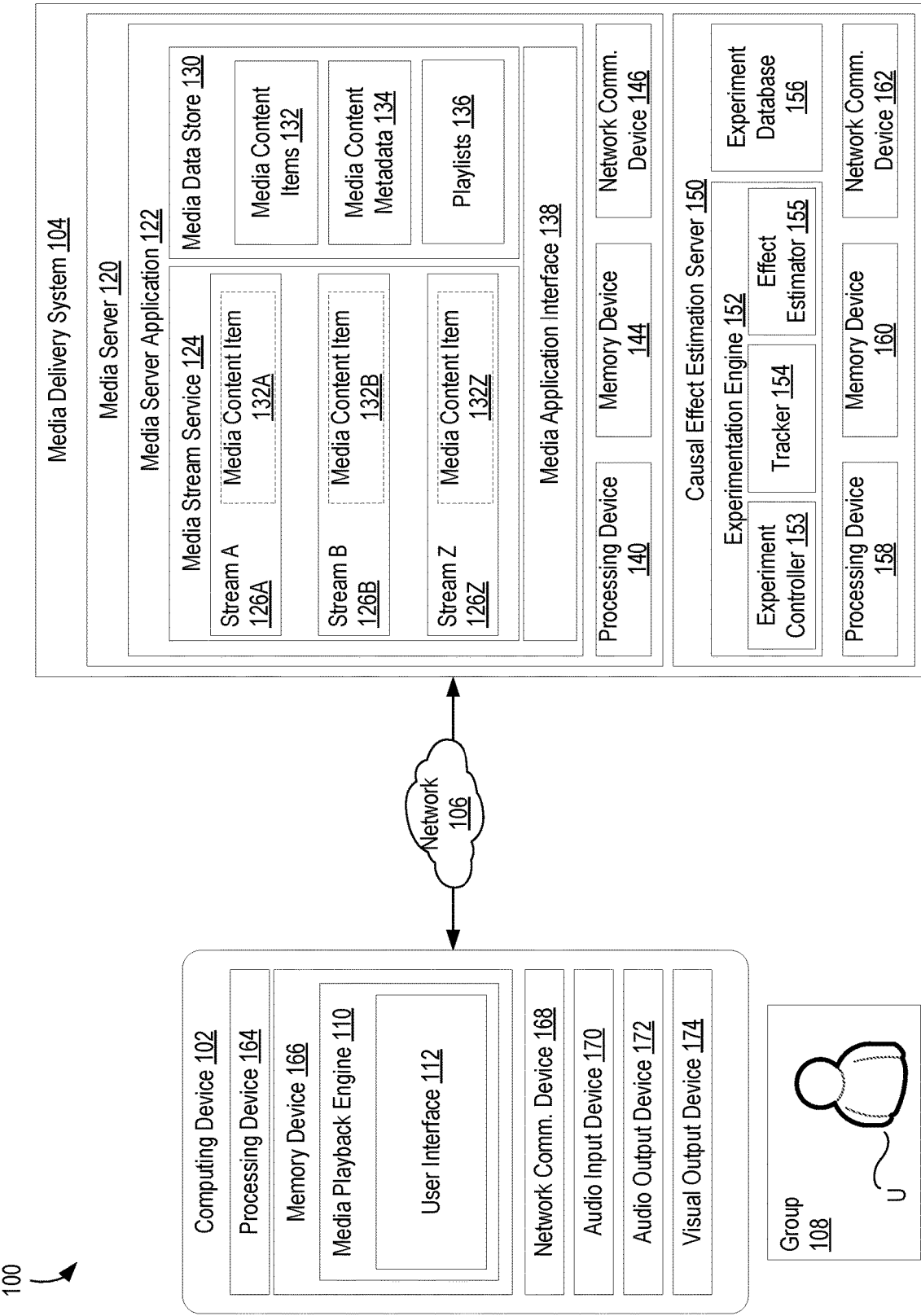
FIG. 7 illustrates a schematic block diagram of another example of a media playback system shown in FIG. 1.

FIG. 7 illustrates a schematic block diagram illustrating another example of the media playback system 100 shown in FIG. 1. In this example, the media playback system 100 includes the computing device 102 for one of the users U in an experiment group 108 and the media delivery system 104. The network 106 is also shown for communication between the computing device 102 and the media delivery system 104.

As described herein, the computing device 102 operates to play media content items to a user U through the media playback engine 110. In some embodiments, the computing device 102 operates to play media content items 132 that are provided (e.g., streamed, transmitted, etc.) by a system remote from the computing device 102 such as the media delivery system 104, another system, or a peer device. Alternatively, in some embodiments, the computing device 102 operates to play media content items stored locally on the computing device 102. Further, in at least some embodiments, the computing device 102 operates to play media content items that are stored locally as well as media content items provided by remote systems.

In some embodiments, the computing device 102 includes a processing device 164, a memory device 166, a network communication device 168, an audio input device 170, an audio output device 172, and a visual output device 174. In the illustrated example, the memory device 166 includes the media playback engine 110 which may display different user interfaces 112 to the user U based on the experimentation group 108 to which the user U is assigned. Other embodiments of the computing device 102 include additional, fewer, or different components. Examples of computing devices include a smartphone, a smart speaker, and a computer (e.g., desktop, laptop, tablet, etc.).

In some embodiments, the processing device 164 comprises one or more processing devices, such as central processing units (CPU). In other embodiments, the processing device 164 additionally or alternatively includes one or more digital signal processors, field-programmable gate arrays, or other electronic circuits. In some embodiments, the processing device 164 includes at least one processing device that can execute program instructions to cause the at least one processing device to perform one or more functions, methods, or steps as described herein.

The memory device 166 operates to store data and program instructions. In some embodiments, the memory device 166 stores program instructions for the media playback engine 110 that enables playback of media content items received from the media delivery system 104, and for the user interface 112 displayed by the media playback engine 110. As described herein, the media playback engine 110 is configured to communicate with the media delivery system 104 to receive one or more media content items— e.g., through the media content streams 126 (including media content streams 126A, 126B, and 126Z).

The memory device 166 includes at least one memory device. The memory device 166 typically includes at least some form of computer-readable media. Computer readable media include any available media that can be accessed by the computing device 102. By way of example, computer-readable media can include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be accessed by the computing device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The network communication device 168 is a device that operates to communicate data across the network 106. The network communication device 168 allows the computing device 102 to communication with remote devices, such as with the media server 120 and the causal effect estimation server 150 of the media delivery system 104. Examples of the network communication device 168 include wired and wireless data communication devices, such as a cellular, WIFI, BLUETOOTH™, LoRa, and wired (e.g., Ethernet) communication device.

Some embodiments include an audio input device 170 that operates to receive audio input, such as voice input provided by the user. The audio input device 170 typically includes at least one microphone. In some embodiments, the audio input device 170 detects audio signals directly, and in other embodiments, the audio input device 170 communicates with another device that detects the audio signals (such as through a Bluetooth-connected microphone).

The audio output device 172 operates to output audible sounds, such as the media content and other audio outputs, such as audio cues. In some embodiments, the audio output device 172 generates media output to play media content to the user U. Examples of the audio output device 172 include a speaker, an audio output jack, and a Bluetooth transceiver (such as for communication with a Bluetooth-connected speaker). In some embodiments, the audio output device 172 generates an audio output directly, and in other embodiments, the audio output device 172 communicates with another device that generates the audio output. For example, the audio output device 172 may transmit a signal through an audio output jack or a Bluetooth transmitter that can be used to generate the audio signal by a connected or paired device such as headphones or a speaker.

Some embodiments also include a visual output device 174. The visual output device 174 includes one or more light-emitting devices that generate a visual output. Examples of the visual output device 174 includes a display device (which can include a touch-sensitive display device) and lights such as one-or-more light-emitting diodes (LEDs). The visual output device 174 may operate to display the user interface 112 to the user U.

Still with reference to FIG. 7, the media delivery system 104 includes one or more computing devices, such as the media server 120 that provides media content items 132 to the computing device 102, and the causal effect estimation server 150 that estimates a long-term causal effect of a change in user interface. Each of the media server 120 and the causal effect estimation server 150 can include multiple computing devices in some embodiments. Although shown as separate servers, the media server 120 and the causal effect estimation server 150 may be the same server.

In some embodiments, the media delivery system 104 operates to transmit media content items 132 to one or more media playback devices such as the computing device 102.

In this example, the media server 120 comprises a media server application 122, a processing device 140, a memory device 144, and a network communication device 146. The processing device 140, memory device 144, and network communication device 146 may be similar to the processing device 164, memory device 166, and network communication device 168 respectively, which have been previously described.

In some embodiments, the media server application 122 operates to stream music or other audio, video, or other forms of media content. The media server application 122 includes a media stream service 124, a media data store 130, and a media application interface 138.

The media stream service 124 operates to buffer media content such as media content items 132 (including 132A, 132B, and 132Z) for streaming to one or more streams 126 (including 126A, 126B, and 126Z).

The media application interface 138 can receive requests or other communication from the media playback devices (such as the computing device 102) or other systems, to retrieve media content items from the media delivery system 104. For example, in FIG. 7, the media application interface 138 receives communications from the media playback engine 110 of the computing device 102.

In some embodiments, the media data store 130 stores media content items 132, media content metadata 134, and playlists 136. The media data store 130 may comprise one or more databases and file systems. Other embodiments are possible as well. As noted above, the media content items 132 may be audio, video, or any other type of media content, which may be stored in any format for storing media content. For example, media content items 132 may be songs, audiobooks, podcasts, or advertisements.

The media content metadata 134 operates to provide information associated with the media content items 132. In some embodiments, the media content metadata 134 includes one or more of title, artist, lyrics, album name, length, genre, mood, era, or other media metadata, as described herein.

The playlists 136 operate to identify one or more of the media content items 132. In some embodiments, the playlists 136 identify a group of the media content items 132 in a particular order. In other embodiments, the playlists 136 merely identify a group of the media content items 132 without specifying a particular order. Some, but not necessarily all, of the media content items 132 included in a particular one of the playlist 136 are associated with a common characteristic such as a common genre, mood, or era.

In this example, the causal effect estimation server 150 includes an experimentation engine 152, an experimentation database 156, a processing device 158, a memory device 160, and a network communication device 162. In the illustrated embodiment, the experimentation engine 152 includes an experiment controller 153, a tracker 154, and an effect estimator 155.

In some embodiments, any one or more of the functions, methods, and operations described herein as being performed by the causal effect estimation server 150—or components of the causal effect estimation server 150, such as the experimentation engine 152—can alternatively be performed by the media playback engine 110. This may include embodiments where the media delivery system 104 does not include a causal effect estimation server 150 and embodiments where the causal effect estimation server 150 cooperates with the media playback engine 110 and the functions are split between those components.

The experimentation engine 152 can operate on a single computing device, or by cooperation of multiple computing devices. For example, the experimentation engine 152 can operate solely on the computing device 102 or solely on the causal effect estimation server 150. Alternatively, portions of the experimentation engine 152 can be performed by one or more other computing devices, such as by data communication between the computing device 102 and the media delivery system 104. In the example shown in FIG. 7, the media delivery system 104 includes the experimentation engine 152. The experimentation engine 152 can perform any one or more of the operations described herein, such as with reference to FIGS. 8 & 9.

The processing device 158, memory device 160, and network communication device 162 may be similar to the processing device 164, memory device 166, and network communication device 168 respectively, which have each been previously described.

In various embodiments, the network 106 includes one or more data communication links, which may include multiple different types. For example, the network 106, can include wired and/or wireless links, including BLUETOOTH™, ultra-wideband (UWB), 802.11, ZigBee, cellular, LoRa, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Although FIG. 7 illustrates only a single computing device 102 in communication with a single media delivery system 104, in accordance with some embodiments, the media delivery system 104 can support the simultaneous use of multiple computing devices 102. Additionally, the computing device 102 can simultaneously access media content from multiple media delivery systems 104.

Figure 8:
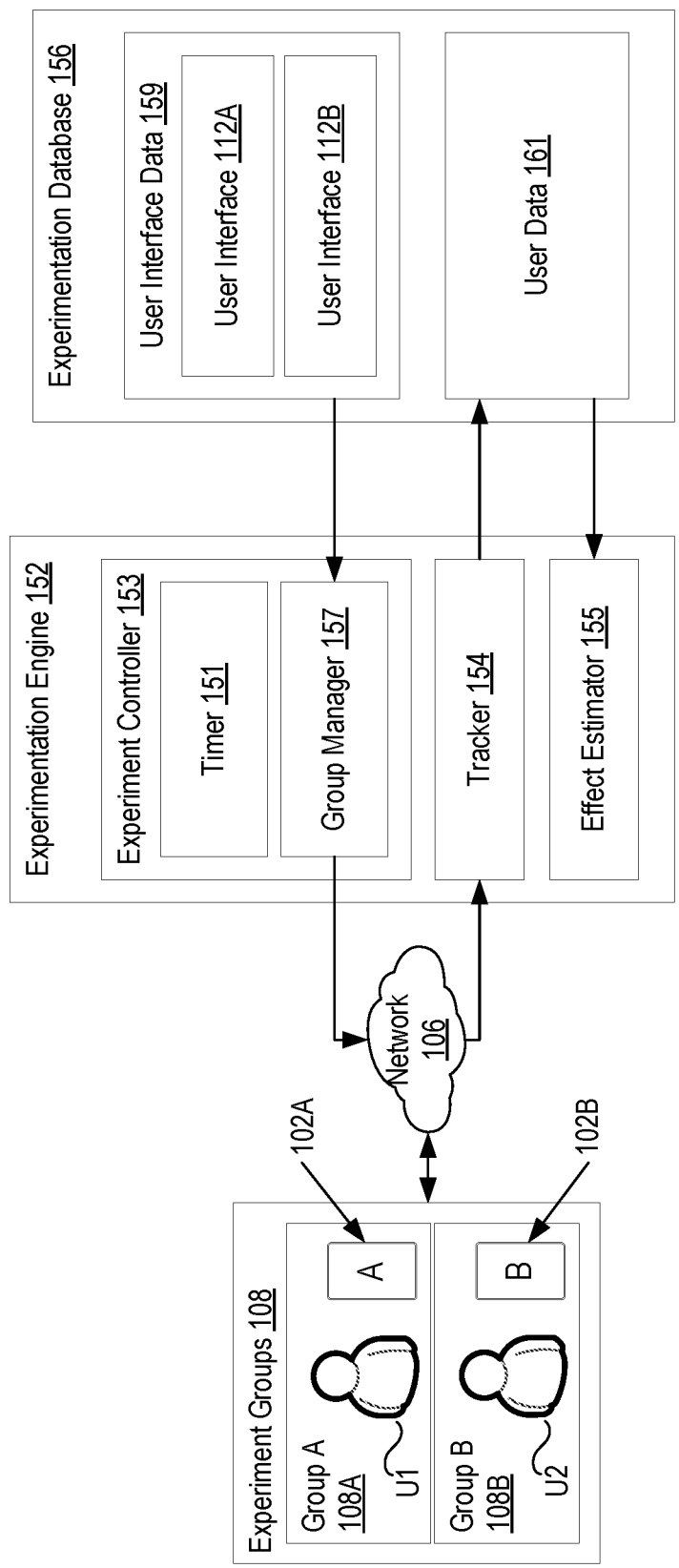
FIG. 8 illustrates an example embodiment of an experimentation engine and an experimentation database.

Turning to FIG. 8, a schematic block diagram of an experimentation engine 152 and an experimentation database 156 is shown. In the illustrated embodiment, the experimentation engine 152 includes an experiment controller 153, which has a timer 151 and a group manager 157, a tracker 154, and an effect estimator 155. The depicted experimentation database 156 includes user interface data 159 and user data 161.

The experimentation engine 152 and its components function to determine a long-term effect of a change in user interface. As briefly described above, the experimentation engine 152 operates to control a short-term randomized controlled experiment to collect unbiased, short-term experimental data. Following the short-term randomized controlled experiment, the experimentation engine 152 collects long-term observational data, which may contain unobserved confounding. The experimentation engine 152 can then use the short-term experimental data and the long-term observational data to determine the long-term effect of the change in user interface.

The experiment controller 153 controls the short-term randomized controlled experiment. In an embodiment the randomized controlled experiment is an A/B test in which a first group of users 108A are shown a first user interface 112A and a second group of users 108B are shown a second user interface 112B. In an example, the second user interface 112B may contain a recommendation that is not included in the first user interface 112A, such as a recommendation for a song, an artist, or an album. To make the A/B test unbiased, users are randomly assigned to the experiment groups 108. The assignment of users to the experiment groups may be done by the group manager 157.

At the beginning of the short-term randomized controlled experiment, the timer 151 may be set for a predetermined amount of time for which the short-term randomized controlled experiment will be performed. In an embodiment, the timer 151 may be set for two weeks. In alternative embodiments, a period in which the short-term randomized controlled experiment is performed may be determined without the timer 151. For example, the experimentation engine 152 may receive input from a user that may cause the experimentation engine 152 to initiate the randomized controlled experiment, and the experiment may similarly be stopped upon receipt of user input at the experimentation engine 152.

During the randomized controlled experiment, the group manager 157 provides the appropriate user interfaces 112 to the users U1, U2 based on the experiment groups 108 to which the users U1, U2 were assigned. The group manager 157 may distribute the user interfaces 112 to computing devices 102 of the user U1, U2 over a network 106. The group manager 157 may generate the user interfaces 112, or the group manager 157 may send data to the computing devices 102 with which the computing devices 102 may generate the user interfaces 112. In an embodiment, the group manager 157 maintains a list of users and their assigned experiment groups 108. In alternative embodiments, the list of users and their assigned experiment groups 108 may be stored in the experimentation database 156, which the group manager 157 may access when providing user interfaces 112 to users U1, U2.

During the randomized controlled experiment, the tracker 154 may collect short-term experimental data. In an embodiment, the short-term experimental data may be listening data, such as a number of minutes that each user U1, U2 listened to a song, album, or artist. For example, in embodiments in which the second user interface 112B includes a recommendation for an album, the tracker 154 may compile listening data for the number of minutes that each user U1, U2 listened to the album during the randomized controlled experiment. In an embodiment, the tracker 154 collects the experimental data at specific points during or around the randomized controlled experiment. For example, the tracker 154 may collect listening data on the first day of the randomized controlled experiment and on the last day of the randomized controlled experiment. In another example, the tracker 154 may collect listening data on the day before the start of the randomized controlled experiment and on the last day of the randomized controlled experiment. The tracker 154 may collect the listening data from the computing devices 102 of the users U1, U2 over the network 106. Once the tracker 154 collects the listening data, it may store the data in the experimentation database 156 with the user data 161.

When the timer 151 expires, the short-term randomized controlled experiment may end, and the experimentation engine 152 may begin to collect long-term observational data during an observational period. As stated above, in alternative embodiments in which the timer 151 is not included, the randomized controlled experiment may end in other ways, such as the experimentation engine 152 receiving user input to end the experiment. The observational period may occur for a predetermined amount of time. For example, the observational period may be six months. In an embodiment, the observational data is collected at the end of the observational period. In alternative embodiments, the observational data may be collected throughout the observational period. The observational data may be the same type of listening data as was collected for the short-term experimental data. For example, if the experimental data included listening data for a number of minutes that each user U1, U2 listened to an album, then the observational data also would also include listening data for a number of minutes that each user U1, U2 listened to the album. Like with the experimental data, the tracker 154 may collect the observational data from computing devices 102 of the users U1, U2 over the network 106, and the tracker 154 may store the observational data in the experimentation database 156 with the user data 161.

As was shown in FIGS. 4 & 5, during the observational period, all users U1, U2 may be shown the same user interface 112, regardless of the experiment group 108 to which they were assigned. For example, during the observational period, all users U1, U2 may be shown the second user interface 112B. Alternatively, during the observational period, all users U1, U2 may be shown the first user interface 112A. This allows the experimentation engine 152 to operate more efficiently during the observational period. Because the experimentation engine 152 does not need to control which users U1, U2 are shown which user interface 112 during the observational period, the experimentation engine 152 may perform fewer operations, and the amount of computing resources, such as processing power and energy, that are used by the experimentation engine 152 is reduced.

As was described with relation to FIG. 5, the observational period may be before the randomized controlled experiment in some embodiments, and as was described in FIG. 6, the observational period may overlap with the randomized controlled experiment. In such embodiments, the experimentation engine 152 may perform substantially the same operations as described above but performed in a different order such that the observational period occurs before the randomized controlled experiment or overlaps with the randomized controlled experiment.

After the short-term experimentation data and the long-term observational data have been collected, the effect estimator 155 may determine the long-term effect of the change in user interface. The effect estimator 155 may use instrumental variable regression to estimate the long-term effect of the change in user interface.

Figure 9:
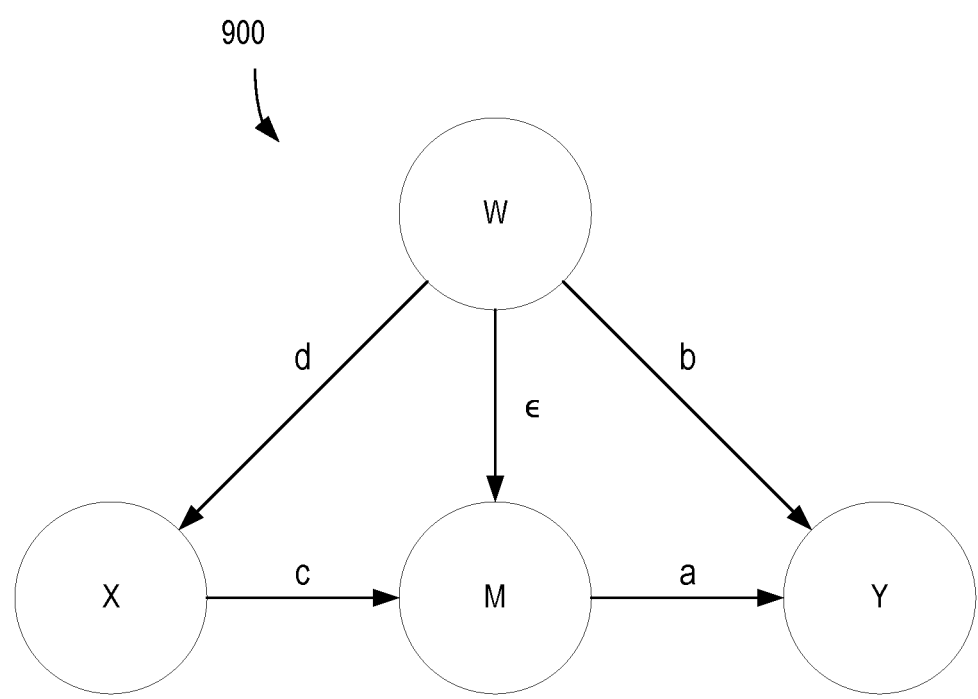
FIG. 9 illustrates an example causal graph that may be used by an effect estimator to estimate a long-term effect of a change in user interface.

FIG. 9 illustrates an example of a causal graph 900 that may be used by an effect estimator (such as the effect estimator 155 of FIG. 8) in estimating the long-term effect of a change in user interface. The causal graph 900 includes four variables X, M, Y, W. These variables represent a treatment X, a mediator M, an outcome Y, and unobserved confounding W. In an embodiment, the mediator M may represent a short-term outcome and the outcome Y may represent a long-term outcome. Data for these variables may come from short-term experimental data and long-term observational data as described above. An experimental dataset may include the short-term data, which may include the treatment X and the mediator M. An observational dataset may include both the short-term data and the long-term data, and may therefore include the treatment X, the mediator M, and the outcome Y. The observational dataset may also include the unobserved confounding W.

In an example, the treatment X may include data collected on a first day of a randomized controlled experiment or it may include data collected before the randomized controlled experiment, such as the day before the randomized controlled experiment. The mediator M may include data collected on a last day of the randomized controlled experiment. In another example, the mediator M may be collected after the randomized controlled experiment, such as the day after the end of the randomized controlled experiment. The treatment X and the mediator M may be used to determine the short-term effect of the change in user interface. As described above, during the randomized controlled experiment, some users may be shown a first user interface while other users may be shown a second user interface. By comparing the difference between the data of the treatment X and the data of the mediator M for the users that were shown the first user interface and the users that were shown the second user interface, the short-term effect of the change in user interface may be determined, as discussed herein. The outcome Y may include data collected a predetermined amount of time after the end of the randomized controlled experiment. In alternative embodiments, the outcome Y may include historical data collected before the randomized controlled experiment, or the outcome Y may include observational data collected while the randomized controlled experiment is ongoing.

The arrows a, b, c, d, (represent the causal effects that the variables X, M, W, Y have on each other. The treatment X, the mediator M, and the outcome Y may be independent Gaussian noise terms with zero mean, while the unobserved confounding W may be independent Gaussian noise term with a non-zero mean. The long-term effect of the change in user interface can be estimated as the product of the short-term effect c of the treatment X on the mediator M and the long-term effect a of the mediator M on the outcome Y.

The effect c of the treatment X on the mediator M may be calculated using the experimental dataset. This may be done by regressing the mediator M on the treatment X. In an example, the effect c of the treatment X on the mediator M is calculated by performing the ordinary least squares (OLS) regression of the mediator M on the treatment X.

The effect a of the mediator M on the outcome Y may be estimated using samples from the observational dataset. This may be done by calculating an instrumental variable ($R_R$) using the samples and then performing instrumental variable regression. In an embodiment, the instrumental variable may enable simulating what would happen if an experiment were performed on the mediator M, and it may represent a portion of the mediator M that has no causal contribution from the treatment X.

The instrumental variable may be calculated by first computing a residual ($R_c$) of a regression of the mediator M on the treatment X using the observational dataset samples. The residual may be determined using the following equation:

$$R_c = M - OLS[M|X]X \quad 1)$$

A ratio of confounding effects ($\epsilon/d$) may also be calculated using samples from the observational dataset. These samples may be the same samples as were used to compute the residual, or they may be different samples. In an embodiment, the ratio of confounding effects may be the ratio of the effect (of the unobserved confounding W on the mediator M and the effect d of the unobserved confounding W on the treatment X. This ratio of confounding effects may be a quotient of a sample mean of the mediator M only affected by the unobserved confounding W and a sample mean of the treatment X. The mediator M only affected by the unobserved confounding W can be estimated as the difference between the mediator M and a product of the treatment X and the effect c of the treatment X on the mediator M. The ratio of confounding effects may be determined using the following equation:

$$\left(\frac{\hat{\epsilon}}{d}\right) = \frac{\overline{M - cX}}{\overline{X}} \quad 2)$$

Using the residual ($R_c$) and the ratio of confounding effects ($\epsilon/d$), the instrumental variable ($R_R$) may be determined. The instrumental variable may be a difference between the residual and a product of the ratio of confounding effects and the treatment M. The instrumental variable may be determined using the following equation:

$$R_R = R_c - \left(\frac{\hat{\epsilon}}{d}\right)X = M - \left(c + \left(\frac{\hat{\epsilon}}{d}\right)\right)X \quad 3)$$

Once the instrumental variable ($R_R$) is determined, it can be used in instrumental variable regression to estimate the effect a of the mediator M on the outcome Y. In an embodiment, this may be done by computing an expected value of a ratio of a first regression of the outcome Y on the instrumental variable and a second regression of the mediator M on the instrumental variable. The effect a of the mediator M on the outcome Y may be represented using the following equation:

$$a = \frac{E[R_R \cdot Y]}{E[R_R \cdot M]} = \frac{E\left[M \cdot Y - \left(c + \frac{\epsilon}{d}\right)X \cdot Y\right]}{E\left[M \cdot M - \left(c + \frac{\epsilon}{d}\right)X \cdot M\right]} \quad 4)$$

By estimating the effect a of the mediator M on the outcome Y in this manner, a substantially unbiased estimate of the effect a can be determined even with the unobserved confounding W in the data. This effect a can then be used with the effect c of the treatment X on the mediator M to estimate the long-term causal effect of the change in user interface.

Figure 10:
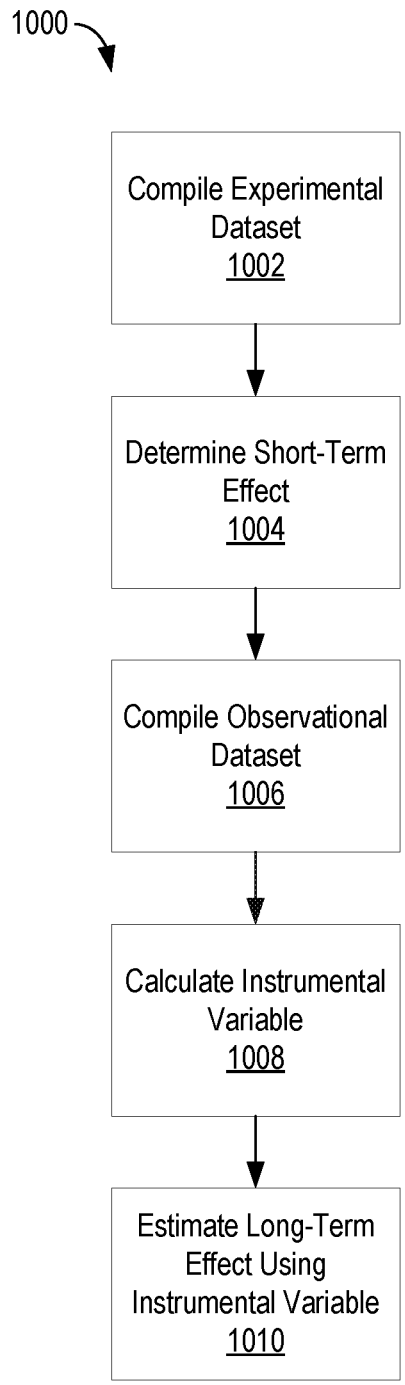
FIG. 10 illustrates a flowchart of an example method for estimating a long-term effect in the presence of unobserved confounding.

Referring now to FIG. 10, a flowchart of a method 1000 for estimating a long-term effect in the presence of unobserved confounding is shown. As explained above, this method 1000 may be used, for example, to estimate the long-term effect of a change in user interface in a media playback application.

The operation 1002 is performed to compile an experimental dataset. The experimental dataset may be a short-term experimental dataset including short-term data on the change in user interface that includes a treatment and a mediator. The experimental dataset may be compiled during a randomized controlled experiment, such as an A/B test. For example, the experimental dataset may be collected during a randomized controlled experiment in which a first group of users is shown a first user interface, and a second group of users is shown a second user interface. In an embodiment, the randomized controlled experiment during which the experimental dataset is compiled may be two weeks long. In alternative embodiments, some data, such as the treatment, may instead be collected before the randomized controlled experiment, and/or some data, such as the mediator, may be collected after the randomized controlled experiment.

As described above, an experimentation engine with an experiment controller and a tracker may be used to compile the experimental dataset. The experiment controller may control the randomized controlled experiment, which may involve providing user interfaces to a plurality of computing devices executing the media playback application based on assigned experiment groups. The tracker may collect the data from the plurality of computing devices during the randomized controlled experiment and store the data in an experimentation database.

The operation 1004 is performed to determine a short-term effect. For example, this may be a short-term effect of the change in user interface. The short-term effect may be calculated by performing a regression of the mediator from the experimental dataset on the treatment from the experimental dataset. As described above, this may be performed by an effect estimator in an experimentation engine.

The operation 1006 is performed to compile an observational dataset. The observational dataset may be a long-term observational dataset, which may include the short-term data from the experimental dataset as well as long-term observational data. The long-term data may include an outcome. The long-term observational dataset may also include unobserved confounding. In an embodiment, the observational dataset is compiled during an observational period that occurs after the randomized controlled experiment. This observational period may be, for example, six months long.

As described above, the observational dataset may be compiled by an experimentation engine with a tracker. Like with the short-term dataset, the tracker may collect data from a plurality of computing devices executing the media playback application and store this data in the experimentation database.

The operation 1008 is performed to calculate an instrumental variable. The instrumental variable may represent, for example, a portion of the mediator that has no causal contribution from the treatment. In an embodiment, the instrumental variable may be calculated by using samples of the observational dataset to regress the mediator on the treatment to compute a residual, using samples from the observational dataset to compute a ratio of confounding effects, and determining a difference between the residual and a product of the ratio of the confounding effects and the treatment. The samples of the observational dataset used to compute the residual may be the same samples used to compute the ratio of confounding effects. Alternatively, two different sets of samples may be used. In an embodiment, the ratio of confounding effects may be computed by taking a quotient of a sample mean of the mediator only affected by unobserved confounding and a sample mean of the treatment. The mediator only affected by unobserved confounding may be calculated as a difference between the mediator and a product of the treatment and the short-term effect. As described above, these calculations may be performed by an effect estimator in an experimentation engine.

The operation 1010 is performed to estimate the long-term effect using the instrumental variable calculated during the operation 1008. This may be done by performing instrumental variable regression. In an embodiment, the instrumental variable regression includes calculating an expected value of a ratio of a first regression of the outcome on the instrumental variable and a second regression of the media-tor on the instrumental variable. As with the operation 1008, this may be performed by an effect estimator in an experimentation engine.

In alternative embodiments, some of the operations shown in the example method 1000 may be performed in a different order. For example, the observational dataset compiled in the operation 1006 may be compiled before the short-term effect is determined in the operation 1004. Additionally, some aspects of the operations may be performed at different times. For example, the long-term data included in the observational dataset compiled in the operation 1006 may be collected before the experimental dataset is compiled in the operation 1002.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method for estimating a long-term effect of a change in user interface of a media playback application, the method comprising:
    compiling, at a server, an experimental dataset including short-term data on the change in user interface using data from a first plurality of computing devices executing the media playback application, wherein the short-term data includes a treatment and a short-term outcome and is associated with a first time period;
    determining from the experimental dataset, a short-term effect of the treatment on the short-term outcome;
    compiling, at the server, an observational dataset including the short-term data on the change in user interface and long-term data on the change in user interface, wherein the long-term data includes a long-term outcome and is associated with a second time period that is greater than the first time period, and wherein the observational dataset includes unobserved confounding, the server compiling the observational dataset using data from a second plurality of computing devices executing the media playback application; and
    estimating a long-term effect of the short-term outcome on the long-term outcome, wherein the long-term effect of the short-term outcome on the long-term outcome is estimated by:
        computing a portion of the short-term outcome using samples from the observational dataset and the short-term effect, wherein the portion of the short-term outcome has no causal contribution from the treatment, and
        performing regression using the portion of the short-term outcome.

2. The method of claim 1, wherein the change in user interface includes displaying a recommendation to a user.

3. The method of claim 1, wherein computing the portion of the short-term outcome using samples from the observational dataset and the short-term effect includes:
    regressing, using samples from the observational dataset, the short-term outcome on the treatment to compute a residual;
    computing, using samples from the observational dataset, a ratio of confounding effects, the ratio of confounding effects being a ratio of an effect of the unobserved confounding on a mediator and an effect of the unobserved confounding on the treatment; and determining a difference between the residual and a product of the ratio of confounding effects and the treatment.

4. The method of claim 3, wherein the ratio of confounding effects is determined using a quotient of a sample mean of the short-term outcome only affected by unobserved confounding and a sample mean of the treatment.

5. The method of claim 4, wherein the short-term outcome only affected by unobserved confounding is a difference between the short-term outcome and a product of the treatment and the short-term effect.

6. The method of claim 1, wherein performing regression using the portion of the short-term outcome includes:
performing a first regression of the long-term outcome on the portion of the short-term outcome,
performing a second regression of the short-term outcome on the portion of the short-term outcome, and
computing an expected value of a ratio of the first regression and the second regression.

7. The method of claim 1, further comprising:
setting a timer for a predetermined amount of time, wherein the short-term data of the experimental dataset and the observational dataset is collected during the first time period when the timer is active and the long-term data of the observational dataset is collected during the second time period after the timer expires.

8. The method of claim 1, further comprising:
setting a timer for a predetermined amount of time, wherein the short-term data of the experimental dataset and the observational dataset is collected during the first time period when the timer is active and the long-term data of the observational dataset is collected during the second time period before the timer is set.

9. The method of claim 1, wherein the first plurality of computing devices is the same as the second plurality of computing devices.

10. The method of claim 1, wherein the first plurality of computing devices is a subset of the second plurality of computing devices.

11. The method of claim 1, wherein the treatment includes listening data collected on a first day of a controlled experiment in the first time period, the short-term outcome includes listening data collected on a last day of the controlled experiment, and the long-term outcome includes listening data collected at an end of an observational period in the second time period after the controlled experiment.

12. A system for estimating a long-term effect of a change in user interface of a media playback application, the system comprising:
one or more processors; and
one or more computer-readable storage devices storing data instructions that, when executed by the one or more processors, cause the system to:
compile an experimental dataset including short-term data on the change in user interface using data from a first plurality of computing devices executing the media playback application, wherein the short-term data includes a treatment and a short-term outcome and is associated with a first time period;
determine, from the experimental dataset, a short-term effect of the treatment on the short-term outcome;
compile an observational dataset including the short-term data on the change in user interface and long-term data on the change in user interface, wherein the long-term data includes a long-term outcome and is associated with a second time period that is greater than the first time period, using data from a second plurality of computing devices executing the media playback application, wherein the observational dataset includes unobserved confounding; and
estimate a long-term effect of the short-term outcome on the long-term outcome, wherein to estimate the long-term effect of the short-term outcome on the long-term outcome includes to:
compute a portion of the short-term outcome using samples from the observational dataset and the short-term effect, wherein the portion of the short-term outcome has no causal contribution from treatment, and
perform regression using the portion of the short-term outcome.

13. The system of claim 12, wherein to compute the portion of the short-term outcome using samples from the observational dataset and the short-term effect includes to:
regress, using samples from the observational dataset, the short-term outcome on the treatment to compute a residual;
compute, using samples from the observational dataset, a ratio of confounding effects, the ratio of confounding effects being a quotient of a sample mean of the short-term outcome only affected by unobserved confounding and a sample mean of the treatment; and
determine a difference between the residual and a product of the ratio of confounding effects and the treatment.

14. The system of claim 13, wherein the short-term outcome only affected by unobserved confounding is a difference between the short-term outcome and a product of the treatment and the short-term effect.

15. The system of claim 14, wherein to perform regression using the portion of the short-term outcome includes to:
perform a first regression of the long-term outcome on the portion of the short-term outcome,
perform a second regression of the short-term outcome on the portion of the short-term outcome, and
compute an expected value of a ratio of the first regression and the second regression.

16. A non-transitory computer-readable medium having stored thereon data instructions that, when executed by one or more processors, cause the one or more processors to:
compile, at a server, an experimental dataset including short-term data on a recommendation, using data from a first plurality of computing devices executing a media playback application, wherein the short-term data includes a treatment and a short-term outcome and is associated with a first time period;
determine from the experimental dataset, a short-term effect of treatment on the short-term outcome;
compile, at the server, an observational dataset including the short-term data on a change in user interface and long-term data on the change in user interface, wherein the long-term data includes a long-term outcome and is associated with a second time period that is greater than the first time period, wherein the observational dataset includes unobserved confounding, and wherein the observational data set is compiled using data from a second plurality of computing devices executing the media playback application; and
estimate a long-term effect of the short-term outcome on the long-term outcome, wherein to estimate the long-term effect of the short-term outcome on the long-term outcome includes to:
compute a portion of the short-term outcome using samples from the observational dataset and the short-term effect, wherein the portion of the short-term outcome has no causal contribution from the treatment, and perform regression using the portion of the short-term outcome.

17. The computer-readable medium of claim 16, wherein to compute the portion of the short-term outcome using samples from the observational dataset and the short-term effect include to:

regress, using samples from the observational dataset, the short-term outcome on the treatment to compute a residual;

compute, using samples from the observational dataset, a ratio of confounding effects, the ratio of confounding effects being a quotient of a sample mean of the short-term outcome only affected by unobserved confounding and a sample mean of the treatment; and determine a difference between the residual and a product of the ratio of confounding effects and the treatment.

18. The computer-readable medium of claim 17, wherein the short-term outcome only affected by unobserved confounding is a difference between the short-term outcome and a product of the treatment and the short-term effect.

19. The computer-readable medium of claim 16, wherein performing regression using the portion of the short-term outcome includes to:

perform a first regression of the long-term outcome on the portion of the short-term outcome, perform a second regression of the short-term outcome on the portion of the short-term outcome, and compute an expected value of a ratio of the first regression and the second regression.

20. The computer-readable medium of claim 16, wherein the recommendation is presented via a change in a user interface.

* * * * *